United States Patent
Park et al.

(10) Patent No.: US 9,771,275 B2
(45) Date of Patent: Sep. 26, 2017

(54) METHOD FOR PREPARING UNIFORM METAL OXIDE NANOPARTICLES WITH HIGH REPRODUCIBILITY

(71) Applicant: HANWHA CHEMICAL CORPORATION, Seoul (KR)

(72) Inventors: Ju Young Park, Daejeon (KR); Eung Gyu Kim, Daejeon (KR); Wan Jae Myeong, Daejeon (KR); Bong Sik Jeon, Daejeon (KR); Eun Byul Kwon, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/101,002

(22) PCT Filed: Nov. 19, 2014

(86) PCT No.: PCT/KR2014/011140
§ 371 (c)(1),
(2) Date: Jun. 2, 2016

(87) PCT Pub. No.: WO2015/083960
PCT Pub. Date: Jun. 11, 2015

(65) Prior Publication Data
US 2016/0297687 A1 Oct. 13, 2016

(30) Foreign Application Priority Data
Dec. 6, 2013 (KR) .................. 10-2013-0151760

(51) Int. Cl.
*C01G 49/02* (2006.01)
*C01G 49/06* (2006.01)
(Continued)

(52) U.S. Cl.
CPC .............. *C01G 49/02* (2013.01); *C01B 13/18* (2013.01); *C01G 1/02* (2013.01); *C01G 49/06* (2013.01);
(Continued)

(58) Field of Classification Search
CPC .......... C01G 49/02; C01G 49/01; C01G 5/00; C01G 7/00; C01G 9/00; C01G 11/00;
(Continued)

(56) References Cited

U.S. PATENT DOCUMENTS 5,746,837 A   5/1998 Beck
6,262,129 B1  7/2001 Murray
(Continued)

FOREIGN PATENT DOCUMENTS

CN   1568285     1/2005
CN   101056815   10/2007
(Continued)

OTHER PUBLICATIONS

Lin, Chun-Rong, et al. "Magnetic properties of monodisperse iron oxide nanoparticles." Journal of applied physics 99.8 (2006): 08N710.*
(Continued)

*Primary Examiner* — Richard M Rump
(74) *Attorney, Agent, or Firm* — Lex IP Meister, PLLC (57) ABSTRACT

The present invention relates to a method for preparing uniform metal oxide nanoparticles. According to the preparation method of the present invention, it is possible to maintain the temperature and pressure inside the reactor in a stable and constant manner by removing water generated in the reaction step for forming metal oxide nanoparticles. Thus, the uniformity of nanoparticles formed is increased, and the reproducibility between batches can be increased even in a repeated process and and a large-scale reaction.

(Continued)

Therefore, the preparation method of the present invention can be used to synthesize uniform nanoparticles reproducibly in large quantities.

9 Claims, 3 Drawing Sheets

(51) Int. Cl.
*C01G 1/02* (2006.01)
*C01B 13/18* (2006.01)
*B82Y 30/00* (2011.01)
*B82Y 40/00* (2011.01)

(52) U.S. Cl.
CPC ............... *B82Y 30/00* (2013.01); *B82Y 40/00* (2013.01); *C01P 2004/04* (2013.01); *C01P 2004/64* (2013.01); *Y10S 977/773* (2013.01); *Y10S 977/811* (2013.01); *Y10S 977/896* (2013.01)

(58) Field of Classification Search
CPC ........ C01G 17/00; C01G 19/00; C01G 23/04; C01G 25/00; C01G 31/00; C01G 37/02; C01G 39/02; C01G 45/02; C01G 55/004; C01G 99/00; B82Y 40/00; B82Y 30/00; Y10S 977/811; Y10S 977/896; Y10S 977/773; C01P 2004/64; C01F 7/02; C01F 11/02; C01F 17/0018

See application file for complete search history.

(56) References Cited

U.S. PATENT DOCUMENTS

| | | | |
|---|---|---|---|
| 2005/0191231 | A1 | 9/2005 | Sun |
| 2006/0211152 | A1 | 9/2006 | Peng |
| 2008/0274041 | A1 | 11/2008 | Hughes |
| 2013/0005620 | A1 | 1/2013 | Ma |
| 2013/0323182 | A1* | 12/2013 | Hyeon ................ A61K 49/186 424/9.322 |

FOREIGN PATENT DOCUMENTS

| | | |
|---|---|---|
| CN | 101090785 | 12/2007 |
| EP | 2784023 | 10/2014 |
| JP | 2009-215146 | 9/2009 |
| JP | 2013-529677 | 7/2013 |
| KR | 10-2003-0030728 | 4/2003 |
| KR | 10-0604975 | 7/2006 |
| KR | 10-2007-0102672 | 10/2007 |
| KR | 10-2010-0123359 | 11/2010 |
| KR | WO 2012108648 A2 * | 8/2012 ........... A61K 49/186 |
| WO | 2008-136855 | 11/2008 |

OTHER PUBLICATIONS

Cooper, Christy L., et al. "Water-soluble iron oxide nanoparticles for nanomedicine." Birck Poster Sessions (2008): 21.*
Search Report & Written Opinion, Patent Cooperation Treaty, Feb. 17, 2015, Application No. PCT/KR2014/011140.
Jongnam Park et al., "Ultra-large-scale syntheses of monodisperse nanocrystals", Nature Materials, vol. 3, pp. 891-895, Nov. 28, 2004.
William W. Yu et al., "Synthesis of monodisperse iron oxide nanocrystals by thermal decomposition of iron carboxylate salts", Chem. Commun., pp. 2306-2307, Sep. 2, 2004.
Chih-Jung Cheng et al., "Synthesis of Monodisperse Magnetic Iron Oxide Nanoparticles from Submicrometer Hematite Powders", Crystal Growh & Design, vol. 8, No. 3, pp. 877-883, Feb. 14, 2008.
Chih-Jung Chen et al., "Preparation of Monodisperse Iron Oxide Nanoparticles via the Synthesis and Decomposition of Iron Fatty Acid Complexes", Nanoscale Res Lett, 4, pp. 1343-1350, Jul. 30, 2009.
Jongnam Park et al., "Synthesis of Monodisperse Spherical Nanocrystals", Angew. Chem. Int. Ed., 46, pp. 4630-4660, May 24, 2007.
Erik Wetterskog et al., "Precise control over shape and size of iron oxide nanocrystals suitable for assembly into ordered particle arrays", Science and Technology Of Advanced Materials. vol. 15, No. 5, Oct. 31, 2014.
Yanglon Hou et al., "Controlled Synthesis and Chemical conversions of FeD Nanoparticles", Angewandte Chemie (International ED in English), vol. 119, No. 33, Aug. 20, 2007.
European Patent Office, The extended European Search Report, European Patent Application No. 14867629.9, Apr. 24, 2017.
M. Mohapatra et al., "Synthesis and applications of nano-structured iron oxides/hydroxides—a review", International Journal of Engineering, Science and Technology, 2010. vol. 2, p. 127-146.

* cited by examiner

METHOD FOR PREPARING UNIFORM METAL OXIDE NANOPARTICLES WITH HIGH REPRODUCIBILITY

BACKGROUND OF THE INVENTION (a) Field of the Invention

The present invention relates to a method for preparing uniform metal oxide nanoparticles with high reproducibility. More specifically, the present invention relates to a method for preparing metal oxide nanoparticles having improved uniformity of nanoparticles and reproducibility of a process.

This application claims priority to Korean Patent Application No. 10-2013-0151760 filed on Dec. 6, 2013 with the Korean Intellectual Property Office, the content of which is herein incorporated by reference in its entirety.

(b) Description of the Related Art

Nanoparticles can have application in a wide range of uses, such as a nano-electronic fusion technology, a biological imaging technology and a medical field and thus they have drawn much interest in the academic and the industry. In particular, since superparamagnetic iron oxide nanoparticles are used in various fields such as a magnetic resonance imaging (MRI) contrast agent, a treatment on a cellular level, a hyperthermia, a drug delivery, a cell separation, and a nucleic acid separation, they account for a large portion of the various types of nanoparticles.

In order to enhance the utilization of iron oxide nanoparticles and reinforce the inherent characteristics of nanoparticles, it is important to synthesize uniform nanoparticles with the desired size in large quantities. Also, in order to produce these high-quality nanoparticles economically, it is important to reduce both process variables and production costs by using a simple production process.

However, in the case of the methods that are currently commercialized, nanoparticles are largely synthesized in a water system or in a gaseous state. The nanoparticles thus obtained are usually hard to have uniform particle shapes and they may have reduced crystallinity. Also, the production of uniformly sized nanoparticles is not easy, and the adjustment of their size is difficult.

Recently, many researchers have developed new processes for preparing, in an organic solvent system, metal oxide nanoparticles having a relatively high quality, that is, uniform size and crystallinity, as compared with the nanoparticles synthesized in a conventional water system.

Prof. Taeghwan Hyeon's research group published in 2004 the results of their research about the synthesis of metal oxide nanoparticles from organic phase using metal chloride as a starting material (Nature Materials 3, 891 895 (2004)). The process for preparing nanoparticles proposed by this research group is composed of a first reaction step of reacting a metal chloride and sodium oleate to give a metal-oleic acid precursor, and a second reaction step of thermally decomposing the precursor to form a nanoparticle. The above reaction allows the synthesis of uniformly sized nanoparticles by using oleic acid as a dispersion stabilizer in an organic solvent having a high boiling point.

The V. Colvin group of Rice University in the United States published in 2004 the results of their research about the synthesis of iron oxide nanoparticles using iron hydroxide as a starting material (Chem. Commun, 2306-2307 (2004)) and found that the nanoparticles are formed by mixing iron hydroxide (FeOOH) with oleic acid in a high boiling point solvent and then heating the mixture at high temperature.

However, the above-mentioned methods for preparing uniform nanoparticles have a problem that the process conditions are complicated and the reproducibility is declined. Among the above methods, the preparation method of nanoparticles proposed by Prof. Taeghwan Hyeon's research group further includes an additional reaction step of preparing a precursor as compared to the production method proposed by Colvin group, and a separation process of recovering the precursor in the first reaction step is additionally necessary. Therefore, production costs due to the addition of process are increased.

In the case of the preparation method of nanoparticles proposed by Colvin group, there were problems that the reproducibility between batches and the dispersibility of the size distribution within batches are increased, and the nanoparticles are not well formed. The problem of the method proposed by Colvin group is due to water generated by decomposition of iron hydroxide which is a precursor in the formation of nanoparticles. Iron hydroxide is decomposed to form water. The water is vaporized in a high-temperature organic solvent and then liquefied at the top of the reactor, and re-flowed into the reactor. When the liquefied water is re-flowed into the reactor, a rapid vaporation occurs, which causes a partial temperature change of the reaction solution and an instantaneous pressure increase in the reactor. The temperature of the reaction solution is an important factor in maintaining the size and uniformity of the particles. And a rapid increase in pressure inside the reactor becomes a threat to safety. In the case of small-scale reaction, the above two can be ignored. However, in the case of large-scale reaction, the amount of water generated increases, which deviates from the level that can be ignored anymore.

SUMMARY OF THE INVENTION

For resolving the aforesaid problems of the prior arts, it is an object of the present invention to provide a method for preparing nanoparticles which has improved uniformity of nanoparticles and reproducibility of a process and which is carried out in a simpler process compared to a conventional process.

To achieve the above object, the present invention provides a method for preparing metal oxide nanoparticles which comprises the steps of injecting a metal precursor compound, a carboxylic acid, and a solvent with a boiling point of more than 200° C. into a reactor to form a mixed solution; and reacting the mixed solution by raising the internal temperature of the reactor up to 200 to 400° C. to form a metal oxide nanoparticle, wherein water generated in the step of reacting the mixed solution is removed.

According to the preparation method of the present invention, it is possible to maintain the temperature and pressure inside the reactor in a stable and constant manner by removing water generated in the reaction step for forming metal oxide nanoparticles. Thus, the uniformity of the nanoparticles formed is increased, and the reproducibility between batches can be increased even in a repeated process and a large-scale reaction. Therefore, the preparation method of the present invention can be used to synthesize uniform nanoparticles reproducibly in large quantities.

DETAILED DESCRIPTION OF THE EMBODIMENTS

In the present disclosure, the terms "the first", "the second", etc. are used to describe various elements, and these terms are used only for the purpose of distinguishing one element from another element.

Also, it means that, when each layer or element is referred to as being formed "on" or "top" of the respective layers or elements, each layer or element is formed on the top of the respective layers or elements, or the other layer or element may be additionally formed between the respective layers, or on the object or the substrate.

While the present invention is susceptible to various modifications and alternative forms, specific embodiments will be illustrated and described in detail as follows. It should be understood, however, that the description is not intended to limit the present invention to the particular forms disclosed herein, but the intention is to cover all modifications, equivalents, and replacements falling within the spirit and scope of the invention.

Hereinafter, the method for preparing metal oxide nanoparticles according to the present invention will be described in detail with reference to the accompanying drawings.

The method for preparing metal oxide nanoparticles according to an embodiment of the present invention comprises the steps of:

the steps of injecting a metal precursor compound, a carboxylic acid, and a solvent with a boiling point of more than 200° C. into a reactor to form a mixed solution; and reacting the mixed solution by raising the internal temperature of the reactor up to 200 to 400° C. to form a metal oxide nanoparticle, wherein water generated in the step of reacting the mixed solution is removed.

In the method for preparing metal oxide nanoparticles according to the present invention, first, a metal precursor compound, a carboxylic acid, and a solvent with a boiling point of more than 200° C. are injected into a reactor to form a mixed solution.

The above metal precursor compound is not particularly limited, except the condition that it is a metal precursor compound that can generate water in the course of the reaction. For example, the metal precursor compound may include hydroxides of one or more metals selected from the group consisting of iron (Fe), cobalt (Co), titanium (Ti), vanadium (V), chromium (Cr), manganese (Mn), nickel (Ni), copper (Cu), zinc (Zn), yttrium (Y), zirconium (Zr), molybdenum (Mo), ruthenium (Ru), rhodium (Rh), palladium (Pd), silver (Ag), cadmium (Cd), cerium (Ce), platinum (Pt), gold (Au), barium (Ba), strontium (Sr), lead (Pb), mercury (Hg), aluminum (Al), gallium (Ga), indium (In), tin (Sn), germanium (Ge) or the like. According to an embodiment of the present invention, iron hydroxide (FeOOH) may be used as the metal precursor compound.

As the carboxylic acid, one or more selected from the group consisting of oleic acid, stearic acid, lauric acid, palmitic acid, octanoic acid and decanoic acid can be used. According to an embodiment of the present invention, oleic acid may be used as the carboxylic acid.

As the high boiling solvent with a boiling point of more than 200° C. aliphatic hydrocarbon compounds such as octadecene, dodecene or tetradecane, ethers such as octyl ether or phenyl ether, amine-based compounds such as oleyl amine, or alcohol compounds such as oleyl alcohol may be used.

According to one embodiment of the present invention, the carboxylic acid may be mixed in an amount of about 2 to about 10 moles, and preferably about 4 to about 6 moles relative to 1 mole of the metal precursor compound. Alternatively, the carboxylic acid may be mixed in an amount of about 1,000 to about 1,400 parts by weight relative to 100 parts by weight of the metal precursor compound.

Further, according to one embodiment of the present invention, the high boiling solvent with a boiling point of more than 200° C. may be mixed in an amount of about 10 to about 100 mL, preferably about 15 to about 30 mL, relative to 1 g of the metal precursor compound. Alternatively, the solvent may be mixed in an amount of about 1,200 to about 1,500 parts by weight relative to 100 parts by weight of the metal precursor compound.

When the reaction is carried out by mixing a metal precursor compound, a carboxylic acid and a solvent with a boiling point of more than 200° C. in the range of the above ratio, the reaction condition can be optimized, thereby preparing more uniform nanoparticles.

The reactor in which the mixed solution containing the metal precursor is injected is gradually heated up to a temperature range of the decomposition temperature or higher of the metal precursor compound.

According to one embodiment of the present invention, the reactor may be heated up to a temperature of about 200 to about 400° C., or about 250 to about 350° C., the maximum value of the temperature of the reactor may vary depending on the kind of the metal precursor compound, carboxylic acid and solvent contained in the mixed solution, and the reaction pressure. For example, when oleic acid is used as the carboxylic acid and octadecene having a boiling point of 315° C. is used as the solvent, the reactor can be heated up to about 320° C.

Heating rate may be about 1 to about 20° C./min, preferably about 2.5 to about 10° C./min.

According to one embodiment of the present invention, the step of raising the temperature of the reactor may be carried out in two parts, but is not limited thereto.

First, in the first raising step, the inside of the reactor is formed in a vacuum state or in a low-pressure state close to the vacuum, and then the temperature is raised at a rate of about 2 to about 10° C./min until it reaches about 40 to about 60° C. Next, the above temperature is maintained for about 20 to about 120 minutes.

In the second raising step, an inert gas such as nitrogen is injected into the reactor and converted into an inert condition. Then, the temperature is raised at a rate of about 25 to about 10° C./min until it reaches the set temperature in the range of about 200 to about 400° C. Next, the temperature is maintained for about 30 to about 90 minutes.

Upon reaching the above-described temperature rise, the reactor is maintained for more than 5 minutes, preferably about 15 to about 90 minutes, more preferably for about 30 to 90 minutes, and the reaction of a mixed solution containing the metal precursor mixture is progressed. Conditions for raising the temperature of the reactor can be subject to those described above, but are not limited thereto.

More specifically, the metal precursor compound in the mixed solution is discomposed to form metal-carboxylic acid compounds. When these are gathered more than a certain ratio, metal oxide nanoparticles in which the surface is surrounded by carboxylic acid is synthesized.

During this process, the metal precursor compound is discomposed in the step of forming metal-carboxylic acid compounds to form water. The formed water is vaporized in a mixed solution which is in a high temperature state to form a water vapor. At this time, since a water vapor is rapidly produced in the mixed solution, the phenomenon where the solution spatters during the reaction occurs. In addition, the generated water vapor is liquefied in the top of the reactor or in the cooler connected with the reactor to generate water. When the generated water is again flowed into the reactor and met with the mixed solution at high temperature, a rapid vaporization occurs from the surface of the mixed solution. Thereby, a change in the temperature of the mixed solution occurs.

However, in the preparation method of the present invention, the temperature of the mixed reaction solution can maintain constant at the initial set temperature by continuously removing water generated in the reaction step. Uniformity of the nanoparticles formed is greatly associated with a temperature change in the reaction step, and when the temperature deviation is drastic, it is difficult to properly form nano-particles. On the other hand, according to the preparation method of the present invention, as a temperature deviation does not substantially occur for the period of time of reaction to maintain the temperature constant the nanoparticles having more uniform particle size distribution can be prepared.

According to one embodiment of the present invention, after raising the internal temperature of the reactor, water generated during the progress of reaction is removed and the re-inflow of water is prevented. Thereby, the internal temperature (T) of the reactor can be maintained in the range of T−5° C.≤T≤T+5° C., preferably T−3° C.≤T≤T+3° C. with respect to the set temperature (T).

Means for removing water is not particularly limited, but according to an embodiment of the present invention, it may be performed as follows. That is, while refluxing a vaporized material generated in the reaction step, water cooled in the refluxing step can be collected in a trap installed between the reactor and the cooler, thereby preventing the re-flow of water into the reactor. If the vaporized material generated in the reaction step is cooled, the carboxylic acid, organic solvent and water contained in the reactor are liquefied and collected together in the trap. At this time, a carboxylic acid and an organic solvent having a lower specific gravity than water are located on the upper end of the trap and returned back into the reactor, and the water will remain in a state of being collected in the lower end of the trap. Therefore, it becomes possible to prevent the water from being re-flowed into the reactor.

Figure 6:
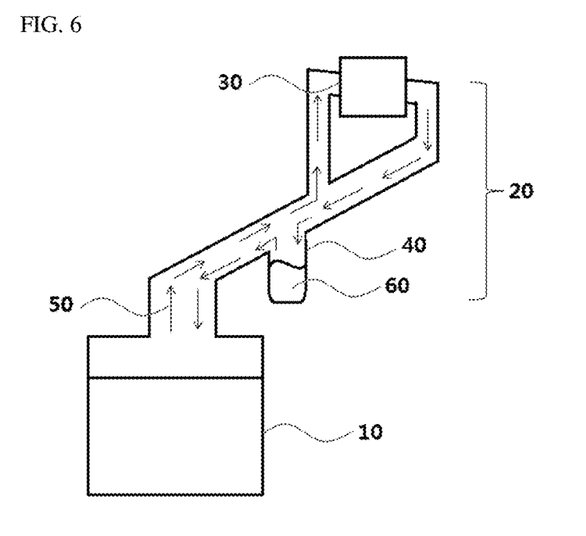
FIG. 6 shows a diagram illustrating a preparation apparatus that can be used in the preparation method of the present invention.

FIG. 6 shows a diagram illustrating a preparation apparatus that can be used in the preparation method of the present invention.

Referring to FIG. 6, the preparation apparatus used in the preparation method of the present invention is composed of a reactor 10 and a reflux device 20, wherein the reflux device 20 includes a cooler 30 and a trap 40. At this time, water 60 cooled in the reflux device 20 is collected in the trap 40 installed between the reactor 10 and the cooler 30, thereby preventing the re-flow of water into the reactor 10.

First, the vaporized material generated in the reaction step of forming nanoparticles in the reactor 10 is circulated through the reflux device 20 and liquefied through the cooler 30. The liquefied mixture is collected in the trap 40 located between the cooler 30 and the reactor 10 before being re-flowed into the reactor 10. In this case, the carboxylic acid and the organic solvent having a lower specific gravity than water are located on the upper end of the trap 40 and returned back into the reactor 10, and water 60 remains in a state of being collected in the lower end of the trap. Therefore, it becomes possible to prevent the water from being re-flowed into the reactor 10

The metal oxide nanoparticles prepared according to the preparation method of the present invention may have an average particle size of about 2 to about 50 nm, preferably about 5 to about 25 nm, and more preferably about 10 to about 15 nm.

In addition, the coefficient of variation (CV) of the particle size of the metal oxide nanoparticles may be about 10% or less, and preferably about 7% or less. Also, the deviation of the average particle size in the repeative processes is low and the reproducibility is secured. Even in an enlarged scale of the reaction product, the same results are shown and thus, uniform nanoparticles can be prepared reproducibily in large quantities.

According to another embodiment of the present invention, there is provided a method for preparing iron oxide nanoparticles which comprises the steps of injecting 100 parts by weight of ion hydroxide (FeOOH), 1,000 to 1,400 parts by weight of oleic acid, and 1.200 to 1,500 parts by weight of octadecene into the reactor to form a mixed solution; and reacting the mixed solution by raising the internal temperature of the reactor up to 310±5 t to form an iron oxide nanoparticle, wherein water generated in the step of reacting the mixed solution is removed.

In the iron oxide nanoparticles prepared at the mixing ratio and temperature of the iron hydroxide, oleic acid and octadecene as described above, the particles with a particle diameter of 10 to 15 nm may account for more than 90% by weight.

According to an embodiment of the present invention, uniform metal oxide nanoparticles can be prepared by maintaining the internal temperature of the reactor at 310±5° C. for 60 to 90 minutes.

In the above method for preparing iron oxide nanoparticles, a method for removing water in the reaction step, a preparation apparatus used herein, and the other reaction conditions are as previously described for the preparation method of metal oxide nanoparticles.

The iron oxide nanoparticles prepared according to the preparation method of the present invention described above may have an average particle size of about 2 to about 50 nm, preferably about 5 to about 25 nm, and more preferably about 10 to about 15 nm.

In addition, the coefficient of variation (CV) of the particle size of the iron oxide nanoparticles may be about 10% or less, and preferably about 7% or less. Also, the deviation of the average particle size in the repeative processes is low and the reproducibility is secured. Even in an enlarged scale of the reaction product, the same results are shown and thus, uniform nanoparticles can be prepared reproducibily in large quantities.

Hereinafter, the components and the technical features of the present invention will be described in more detail with reference to the following Examples. However, the following Examples are provided only for the purpose of illustrating the present invention in detail, and they are not intended to limit the technical scope of the components of the present invention to those exemplified in the examples.

EXAMPLES

Iron hydroxide (FeOOH) was purchased from Sigma and Alfa Aesar. Sigma's iron hydroxide, amorphous granular type, was ground using an alumina mortar and pestle and then passed through a 140 µm mesh sieve, and the resulting powder was used in the experiment. Alfa Aesar's iron hydroxide which is goethite, alpha-phase, and a needle-like crystal powder, was used as it stands in the experiments. Oleic acid and octadecene were purchased from Sigma.

Example 1

7.1 g of iron hydroxide (Sigma), 90.3 g of oleic acid and 100 g of octadecene were put in a 1 L round-bottom three-neck flask and placed in a mantle having the functionality of magnetic stirring. A magnet for stirring was put in a flask. A trap was installed at the top of the flask, and a cooler was installed thereon. The nitrogen injection and vacuum pump connecting line was installed on one side of inlet, and a thermometer for temperature control was installed on another side. Using a vacuum pump, the inside of the flask was created in a vacuum state and the temperature was raised at a rate of 2° C./min up to 60° C. and then maintained at 60° C. for 2 hours.

Next, nitrogen gas was injected into the flask until it reaches the normal pressure (1 atm) and the condition was changed to an inert atmosphere. The temperature of the mixed solution was raised at a rate of 5° C./min up to 310° C., then maintained at 310° C. for 1 hour, and then naturally cooled to the room temperature. While the reaction was progressed, the refluxing was progressed simultaneously. The re-inflow of water from the refluxed solution was prevented by the trap installed at the top of the flask.

The experiments were repeated 20 times in total by the method described above.

Before the reaction, a dark brown precursor (iron hydroxide) powder in the reactor was sunk down in a transparent solvent bed. However, after completion of the reaction, the transparent solvent was changed to a dark brown colloidal solution, and the precursor in powder form was not observed.

Example 2

7.1 g of iron hydroxide (Alfa Aesar), 90.3 g of oleic acid and 100 g of octadecene were put in a 1 L round-bottom three-neck flask and placed in a mantle having the functionality of magnetic stirring. A magnet for stirring was put in a flask. A trap was installed at the top of the flask, and a cooler was installed thereon. The nitrogen injection and vacuum pump connecting line was installed on one side of inlet, and a thermometer for temperature control was installed on another side. Using a vacuum pump, the inside of the flask was created in a vacuum state and the temperature was raised at a rate of 2° C./min up to 60° C. and then maintained at 60° C. for 2 hours.

Next, nitrogen gas was injected into the flask until it reaches the normal pressure (1 atm) and the condition was changed to an inert atmosphere. The temperature of the mixed solution was raised at a rate of 5° C./min up to 320° C., then maintained at 320° C. for 4 hours, and then naturally cooled to the room temperature. While the reaction was progressed, the refluxing was progressed simultaneously. The re-inflow of water from the refluxed solution was prevented by the trap installed on the top of the flask.

The experiments were repeated 4 times in total by the method described above.

As in Example 1, after completion of the reaction, the transparent solvent was changed to a dark brown colloidal solution, and the precursor in powder form was not observed, which showed that nanoparticles were successfully formed.

Comparative Example 1

7.1 g of FeOOH (Sigma), 90.3 g of oleic acid and 100 g of octadecene were put in a 1 L round-bottom three-neck flask and placed in a mantle having the functionality of magnetic stirring. A magnet for stirring was put in a flask. A cooler was installed at the top of the flask. The nitrogen injection and vacuum pump connecting line was installed on one side of inlet, and a thermometer for temperature control was installed on another side. Using a vacuum pump, the inside of the flask was created in a vacuum state and the temperature was raised at a rate of 2° C./min up to 60° C. and then maintained at 60° C. for 2 hours.

Next, nitrogen gas was injected into the flask until it reaches the normal pressure (1 atm) and the condition was changed to an inert atmosphere. The temperature of the mixed solution was raised at a rate of 5° C./min up to 310° C., maintained at 310° C. for 1 hour, and the heating was then stopped. Then, the solution was naturally cooled to the room temperature.

The experiments were repeated 10 times in total by the method described above, but nanoparticles were not properly formed, and a black gel-like substance not dispersed in the organic phase was formed.

Experimental Example

Observation of Nanoparticles

The nanoparticles obtained in Examples 1, 2 and Comparative Example 1 were observed using a transmission electron microscope (TEM). In Comparative Example 1, the nanoparticles were not properly formed and thus observed by sampling a supernatant.

Figure 1:
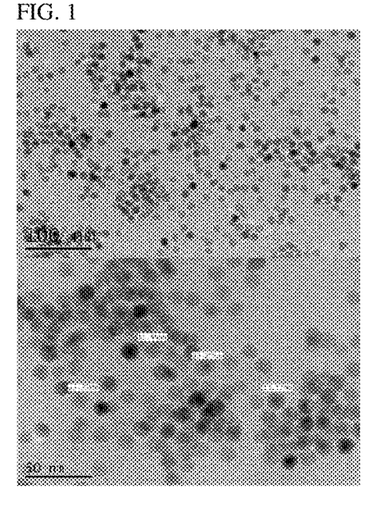
FIG. 1 shows a TEM image of the nanoparticle obtained from Example 1 of the present invention.
Figure 2:
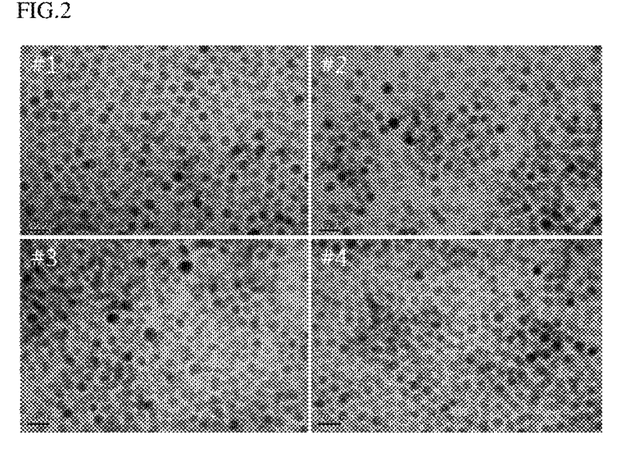
FIG. 2 shows a TEM image of the nanoparticle obtained from Example 2 of the present invention.
Figure 3:
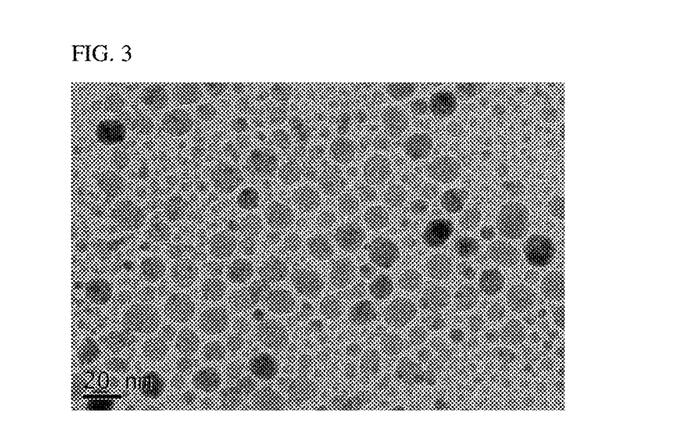
FIG. 3 shows a TEM image of the nanoparticle obtained from Comparative Example 1.

FIGS. 1 to 3 are photographs obtained by observing the nanoparticles obtained in Examples 1, 2 and Comparative Example 1 using a transmission electron microscope (TEM), respectively.

Referring to FIGS. 1 to 3, the nanoparticles obtained in accordance with Examples 1 and 2 of the present invention showed that the particle size was very uniform, but the nanoparticle in accordance with Comparative Example 1 showed that the particle size distribution was irregular.

Measurement of the Distribution of the Nanoparticles

In Example 1, the maximum value, minimum value, average, standard deviation, coefficient of variation (CV, standard deviation/average×100) are shown in Table 1 below.

TABLE 1

| Batch No. | Maximum/Minimum (unit: nm) | Average (unit: nm) | Standard deviation (unit: nm) | CV(%) |
|---|---|---|---|---|
| 1 | 14.92/11.43 | 13.29 | 0.64 | 4.79 |
| 2 | 14.94/11.68 | 13.15 | 0.64 | 4.89 |

TABLE 1-continued

| Batch No. | Maximum/Minimum (unit: nm) | Average (unit: nm) | Standard deviation (unit: nm) | CV(%) |
|---|---|---|---|---|
| 3 | 14.87/12.00 | 13.02 | 0.61 | 4.70 |
| 4 | 14.25/10.96 | 12.48 | 0.71 | 5.71 |
| 5 | 14.95/12.00 | 13.12 | 0.65 | 4.96 |
| 6 | 15.75/12.04 | 13.64 | 0.67 | 4.94 |
| 7 | 15.90/10.51 | 12.74 | 0.80 | 6.26 |
| 8 | 16.28/11.87 | 14.06 | 0.88 | 6.23 |
| 9 | 15.34/10.38 | 12.73 | 0.83 | 6.53 |
| 10 | 15.03/11.44 | 12.96 | 0.72 | 5.57 |
| 11 | 15.04/11.92 | 13.56 | 0.68 | 5.03 |
| 12 | 14.85/11.09 | 12.67 | 0.73 | 5.74 |
| 13 | 14.46/10.46 | 12.51 | 0.71 | 5.69 |
| 14 | 14.85/11.64 | 13.25 | 0.69 | 5.21 |
| 15 | 14.58/10.52 | 12.88 | 0.71 | 5.52 |
| 16 | 13.92/10.06 | 11.88 | 0.66 | 5.56 |
| 17 | 13.24/10.88 | 11.81 | 0.50 | 4.22 |
| 18 | 14.22/11.01 | 12.49 | 0.66 | 5.26 |
| 19 | 14.68/10.92 | 12.51 | 0.72 | 5.78 |
| 20 | 14.92/11.44 | 13.42 | 0.75 | 5.62 |

Referring to Table 1, it could be confirmed that, in the case of preparing the nanoparticles under conditions of Example 1, the uniformity between batches was excellent in view of the facts that the average distribution in the 20 times (in total)-repeated experiments was within 13±1.3 nm. Also, it could be confirmed that the CV value in the entire batch was within 10% and the uniformity in the batches was very excellent.

In Example 2, the average, maximum value, minimum value, standard deviation, coefficient of variation (CV, standard deviation/average×100) are shown in Table 2 below.

TABLE 2

| Batch No. | Maximum/Minimum (unit: nm) | Average (unit: nm) | Standard Deviation (unit: nm) | Coefficent of variation (unit: %) |
|---|---|---|---|---|
| 1 | 11.82/8.43 | 10.38 | 0.61 | 5.88 |
| 2 | 11.97/9.07 | 10.42 | 0.62 | 5.95 |
| 3 | 11.13/9.25 | 10.05 | 0.43 | 4.24 |
| 4 | 11.46/8.22 | 9.89 | 0.62 | 6.22 |

Referring to Table 2, it was confirmed that the average particle size in the four times-repeated experiments showed uniform results in a level of about 10 nm and thus the preparation method of the present invention showed an excellent reproducibility. In addition, it could be confirmed that the coefficient of variation in the repeative experiments was 4-6% and very uniform nanoparticles were formed even within the batches.

In Comparative Example 1 where the reaction was carried out without removing water, nanoparticles were not smoothly formed, and even a partially formed nanoparticle showed a very large particle size distribution.

Measurement of the Change in Reaction Temperature

Figure 4:
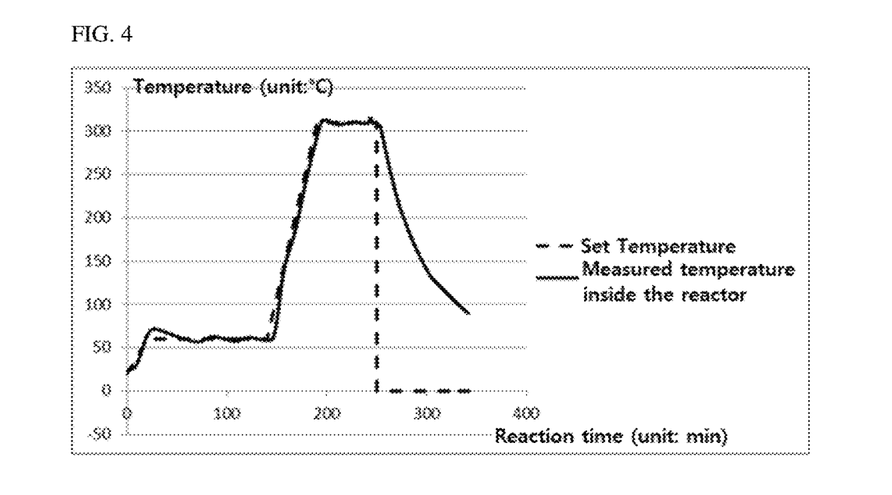
FIG. 4 shows a graph comparing the results obtained by measuring the internal temperature of the reactor and the set temperature in Example 1.

FIG. 4 shows a graph comparing the results obtained by measuring the internal temperature of the reactor and the temperature set through a temperature controller during the formation of nanoparticles in Example 1. Also, FIG. 5 shows a graph comparing the results obtained by measuring the internal temperature of the reactor and the temperature set through a temperature controller during the formation of nanoparticles in Comparative Example 1.

Referring to FIG. 4, it can be seen that the set temperature 310° C. and the temperature actually measured inside the reactor were not substantially different and there was almost no temperature deviation. During maintenance at 310° C. in Example 1, the temperature change width was the maximum value of 312° C. and the minimum value of 298° C., which was maintained within ±2° C.

Figure 5:
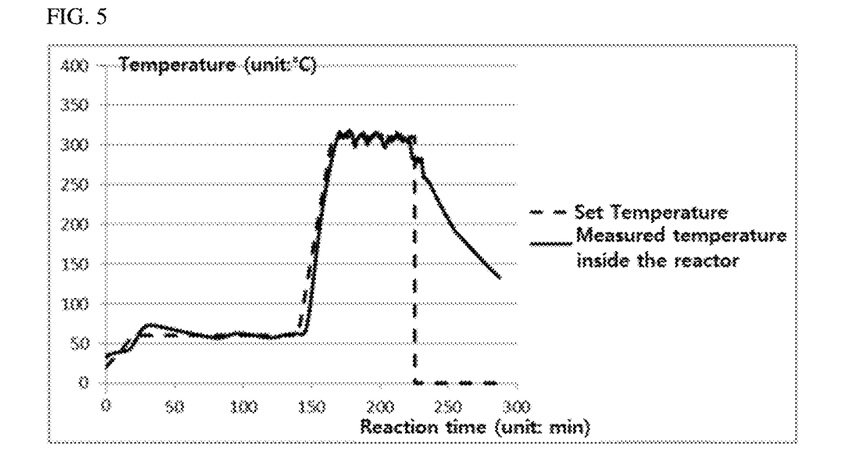
FIG. 5 shows a graph comparing the results obtained by measuring the internal temperature of the reactor and the set temperature in Comparative Example 1.

However, looking at the graph of FIG. 5, it could be confirmed that Comparative Example 1 appeared a large temperature change width without maintaining constant at the set temperature of 310° C. During maintenance of the temperature in Comparative Example 1, the temperature change width was the maximum value of 318° C. and the minimum value of 296° C., which was significantly changed at the set temperature of 310° C., and it could be confirmed through the graph that such changes occurred frequently.

It can be seen that this was because water produced during the reaction process was vaporized, liquefied from the top of the reactor, re-flowed into the reactor, during which a rapid vaporization occurred, thereby causing a temperature variation of the reaction solution.

DESCRIPTION OF SYMBOLS

10: Reactor
20: Reflux device
30: Cooler
40: Trap
50: Vaporized material
60: Water

What is claimed is:

1. A method for preparing metal oxide nanoparticles which comprises the steps of
   injecting a metal precursor compound comprising at least one metal hydroxide selected from the group consisting of iron (Fe), cobalt (Co), titanium (Ti), vanadium (V), chromium (Cr), manganese (Mn), nickel (Ni), copper (Cu), yttrium (Y), zirconium (Zr), molybdenum (Mn), ruthenium (Ru), rhodium (Rh), palladium (Pd), silver (Ag), cadmium (Cd), cerium (Ce), platinum (Pt), gold (Au), barium (Ba), strontium (Sr), lead (Pb), mercury (Hg), aluminum (Al), gallium (Ga)<indium (In), tin (Sn) and germanium (Ge), a carboxylic acid, and a solvent with a boiling point of more than 200° C. into a reactor to form a mixed solution; and
   reacting the mixed solution by raising the internal temperature of the reactor up to 200 to 400° C. to form a metal oxide nanoparticle, wherein water generated in the step of reacting the mixed solution is removed,
      wherein the step of reacting the mixed solution to form a metal oxide nanoparticle is carried out while refluxing a vaporized material generated in the reaction step, and wherein water cooled during the refluxing process is removed by using trap, thereby preventing re-inflow of water.

2. The method for preparing metal oxide nanoparticles according to claim 1, wherein after raising the internal temperature of the reactor, the reactor is maintained at the set temperture for more than 5 minutes.

3. The method for preparing metal oxide nanoparticles according to claim 1, wherein after raising the internal temperature of the reactor, the internal temperature (T') of the reactor is maintained at T−5° C.≤T'≤T+5° C. with respect to the set temperature (T).

4. The method for preparing metal oxide nanoparticles according to claim 1, wherein the metal oxide nanoparticles have an average particle size of 2 to 50 nm.

5. The method for preparing metal oxide nanoparticles according to claim 4, wherein a coefficient of variation (CV) of the particle size of the metal oxide nanoparticles is 10% or less.

6. The method for preparing metal oxide nanoparticles according to claim 1, wherein the metal precursor compound is iron hydroxide (FeOOH).

7. The method for preparing metal oxide nanoparticles according to claim 1, wherein the carboxylic acid includes one or more selected from the group consisting of oleic acid, stearic acid, lauric acid, palmitic acid, octanoic acid and decanoic acid.

8. A method for preparing iron oxide nanoparticles which comprises the steps of injecting 100 parts by weight of iron hydroxide (FeOOH), 1,000 to 1,400 parts by weight of oleic acid, and 1,200 to 1,500 parts by weight of octadecene into the reactor to form a mixed solution; and reacting the mixed solution by raising the internal temperature of the reactor up to 310±5° C. to form an iron oxide nanoparticle, wherein water generated in the step of reacting the mixed solution is removed.

9. The method for preparing iron oxide nanoparticles according to claim 8, wherein the iron oxide nanoparticles with a particle diameter of 10 to 15 nm account for more than 90% by weight.

\* \* \* \* \*